United States Patent
Yang

(10) Patent No.: US 10,101,779 B2
(45) Date of Patent: Oct. 16, 2018

(54) HEAT DISSIPATION UNIT OF HANDHELD ELECTRONIC DEVICE

(71) Applicant: Asia Vital Components Co., Ltd., New Taipei (TW)

(72) Inventor: Hsiu-Wei Yang, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 0 days.

(21) Appl. No.: 14/103,000

(22) Filed: Dec. 11, 2013

(65) Prior Publication Data

US 2015/0160703 A1    Jun. 11, 2015

(51) Int. Cl.
*G06F 1/20* (2006.01)

(52) U.S. Cl.
CPC .................. *G06F 1/203* (2013.01)

(58) Field of Classification Search
CPC ........... G06F 1/20; G06F 1/203; H01L 23/373
USPC ........ 361/679.54, 702, 707, 720; 165/104.26
See application file for complete search history.

(56) References Cited

U.S. PATENT DOCUMENTS

| | | | | |
|---|---|---|---|---|
| 2010/0127299 | A1* | 5/2010 | Smith | H01L 35/28 257/99 |
| 2012/0281361 | A1* | 11/2012 | Gunderson | 361/707 |
| 2014/0043769 | A1* | 2/2014 | Chang et al. | 361/720 |
| 2014/0352926 | A1* | 12/2014 | Sun et al. | 165/104.26 |

* cited by examiner

*Primary Examiner* — Mukund G Patel
(74) *Attorney, Agent, or Firm* — Jackson IPG PLLC; Demian K. Jackson

(57) ABSTRACT

A heat dissipation unit of handheld electronic device is applied to and assembled with a handheld electronic device. The heat dissipation unit includes a main body having a heat absorption section and a heat dissipation section respectively disposed on two sides of the main body. The heat absorption section is made of ceramic material. The heat dissipation section is a heat dissipation conductor. The heat absorption section and the heat dissipation section are respectively correspondingly positioned in the handheld electronic device and outside the handheld electronic device. The heat generated inside the handheld electronic device can be quickly conducted from the ceramic-made heat absorption section to the heat dissipation section and then conducted from the heat dissipation section to outer side of the handheld electronic device. Accordingly, the lifetime of the handheld electronic device is prolonged and the efficiency of the handheld electronic device is enhanced.

3 Claims, 3 Drawing Sheets

HEAT DISSIPATION UNIT OF HANDHELD ELECTRONIC DEVICE

BACKGROUND OF THE INVENTION

1. Field of the Invention

The present invention relates generally to a heat dissipation unit of handheld electronic device, and more particularly to a heat dissipation unit applied to and assembled with a handheld electronic device. The heat dissipation unit includes a main body having a heat absorption section and a heat dissipation section. The heat absorption section is made of ceramic material. The heat dissipation section is made of heat dissipation conductor. The heat generated inside the handheld electronic device can be quickly conducted from the heat absorption section to the heat dissipation section and then conducted from the heat dissipation section to outer side of the handheld electronic device.

2. Description of the Related Art

A handheld electronic device can be carried by a user and operated and used personally. The density of the electronic components arranged in the electronic device has become higher and higher. On the other hand, the volume of the electronic device has become smaller and smaller and the weight of the electronic device has become lighter and lighter. The miniaturization of the electronic device leads to the problem of heat dissipation. Therefore, it has become a critical issue in this field how to solve heat dissipation problem of the electronic device, especially the handheld electronic device.

The commercially available handheld electronic device has a case generally made of plastic material. The handheld electronic device has a smaller volume so that the electronic components arranged in the handheld electronic device are miniaturized. Under such circumstance, it is uneasy to dissipate the heat generated by the electronic components. Therefore, the heat of the handheld electronic device is hard to dissipate. As a result, the electronic components inside the handheld electronic device are likely to fail due to overheating. Accordingly, the lifetime of the handheld electronic device will be shortened and the efficiency of the handheld electronic device will be deteriorated.

Some manufacturers in this field have developed various cases of handheld electronic devices, which are mainly made of metal material, especially aluminum-magnesium alloy. Such case is lightweight and has higher strength as well as a beautiful appearance. Therefore, such cases have almost become the main stream of the newest generation of handheld electronic devices. However, the aluminum-magnesium alloy-made case of the handheld electronic device is simply more beautiful than the plastic-made case, while the heat generated by the electronic components arranged in the handheld electronic device is still hard to dissipate. This will shorten the lifetime of the handheld electronic device.

According to the above, the conventional device has the following shortcomings:

1. The heat can be hardly dissipated.
2. The lifetime of the handheld electronic device is shortened.

SUMMARY OF THE INVENTION

It is therefore a primary object of the present invention to provide a heat dissipation unit of handheld electronic device. The heat dissipation unit is applied to and assembled with a handheld electronic device. The heat dissipation unit includes a main body having a heat absorption section and a heat dissipation section. The heat absorption section is made of ceramic material. The heat dissipation section is made of heat dissipation conductor. The heat generated inside the handheld electronic device can be quickly conducted from the heat absorption section to the heat dissipation section and then conducted from the heat dissipation section to outer side of the handheld electronic device.

To achieve the above and other objects, the heat dissipation unit of handheld electronic device of the present invention includes a main body having a heat absorption section and a heat dissipation section respectively disposed on two sides of the main body. The heat absorption section is made of ceramic material. The heat dissipation section is a heat dissipation conductor. When the main body is assembled with the handheld electronic device, the heat absorption section and the heat dissipation section are respectively correspondingly positioned in the handheld electronic device and outside the handheld electronic device.

The ceramic material has the properties of heat-resistance and low thermal expansion coefficient. Therefore, the heat generated inside the handheld electronic device can be quickly conducted from the ceramic-made heat absorption section of the main body to the heat dissipation section and then conducted from the heat dissipation section to outer side of the handheld electronic device. Accordingly, the lifetime of the handheld electronic device is prolonged.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
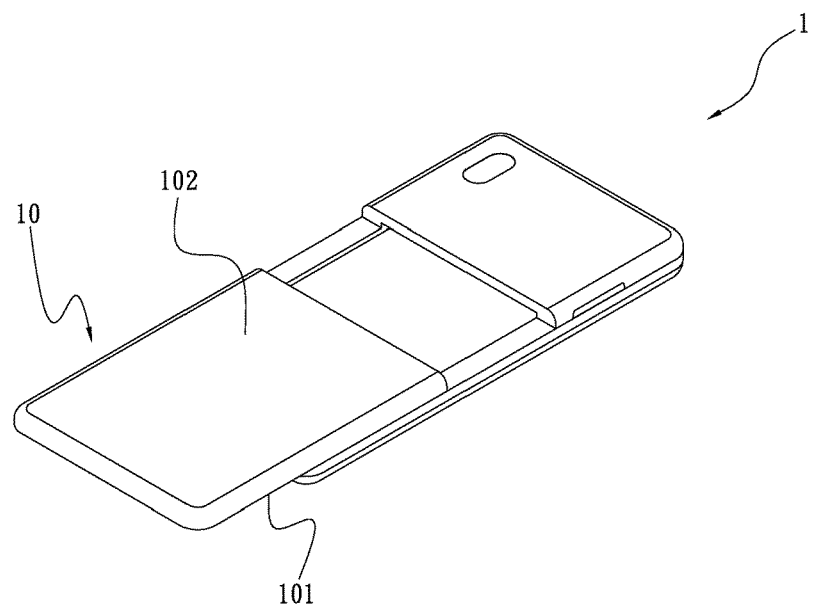
FIG. 1A is a perspective exploded view of a first embodiment of the heat dissipation unit of handheld electronic device of the present invention.
Figure 1B:
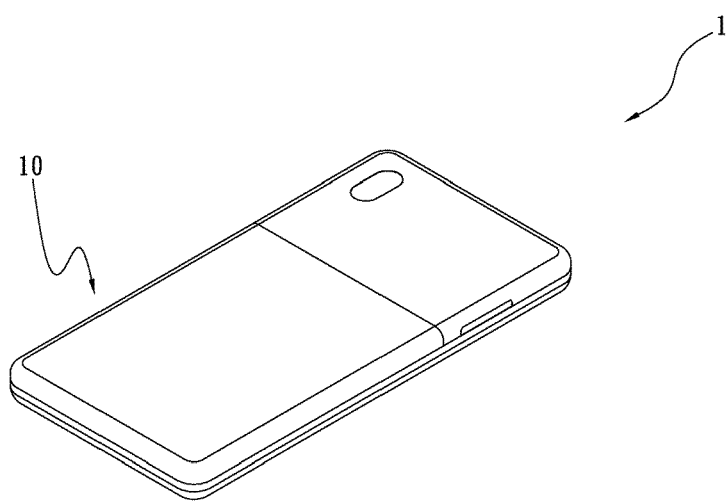
FIG. 1B is a perspective assembled view of the first embodiment of the heat dissipation unit of handheld electronic device of the present invention.
Figure 1C:
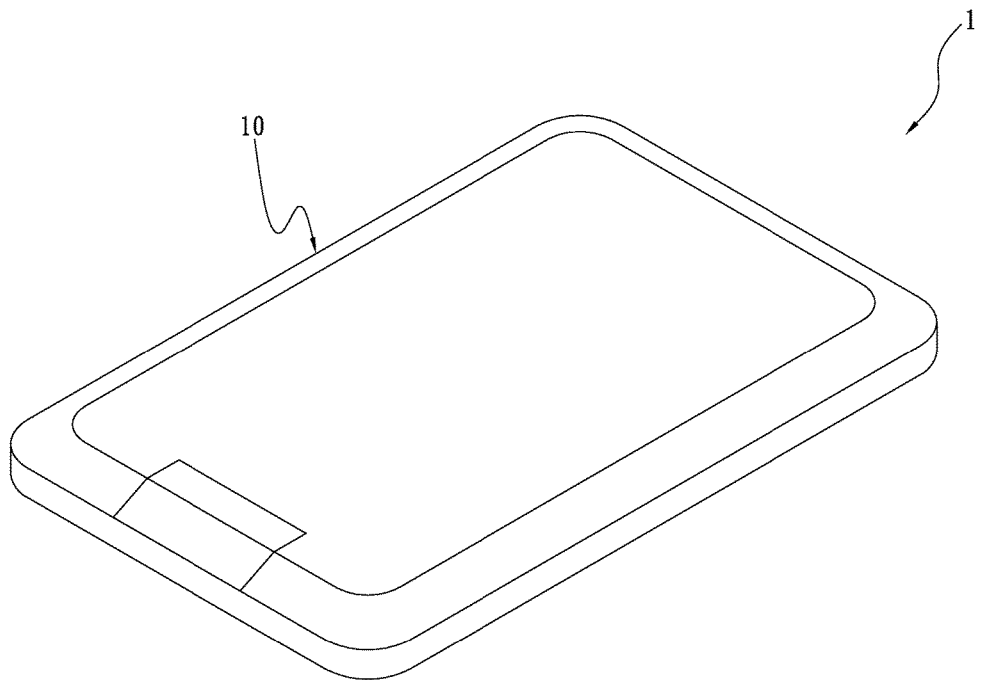
FIG. 1C is a perspective view of the first embodiment of the heat dissipation unit of handheld electronic device of the present invention.
Figure 3:
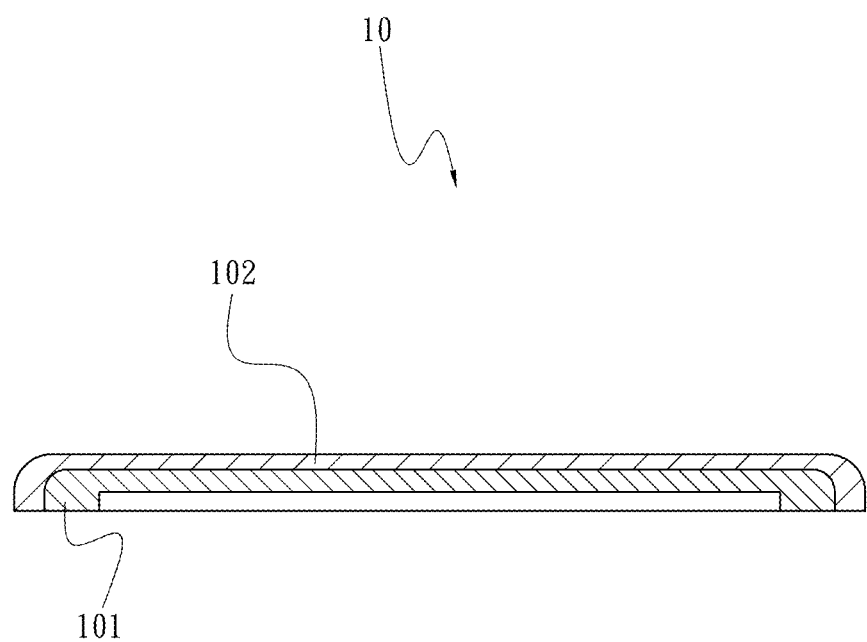
FIG. 3 is a side-section view of an embodiment of a heat dissipation unit of a handheld electronic device.

Please refer to FIGS. 1A, 1B, 1C, and 3. FIG. 1A is a perspective exploded view of a first embodiment of the heat dissipation unit of handheld electronic device of the present invention. FIG. 1B is a perspective assembled view of the first embodiment of the heat dissipation unit of handheld electronic device of the present invention. FIG. 1C is a perspective view of the first embodiment of the heat dissipation unit of handheld electronic device of the present invention. FIG. 3 is a side-section view of an embodiment of a heat dissipation unit of a handheld electronic device. According to the first embodiment, the heat dissipation unit of handheld electronic device of the present invention is applied to and assembled with a handheld electronic device 1, including a main body 10 having a heat absorption section 101 and a heat dissipation section 102. The heat absorption section 101 and the heat dissipation section 102 are respectively disposed on two sides of the main body 10. The heat absorption section 101 is made of ceramic material. The heat dissipation section 102 is a heat dissipation conductor (made of metal or high thermal conductivity material). When the main body 10 is assembled with the handheld electronic device 1, the heat absorption section 101 and the heat dissipation section 102 are respectively positioned in the handheld electronic device 1 and outside the handheld electronic device 1.

The handheld electronic device 1 can be a mobile phone or a tablet (as shown in FIG. 1C).

In the heat dissipation unit of the handheld electronic device 1, the ceramic material has the properties of heat-resistance and low thermal expansion coefficient. Therefore, the heat generated inside the handheld electronic device 1 is first conducted from the ceramic-made heat absorption section 101 of the main body 10 to the heat dissipation section 102 made of heat dissipation conductor. Then, the heat is conducted from the heat dissipation section 102 to outer side of the handheld electronic device 1. Accordingly, the heat generated inside the handheld electronic device 1 can be quickly conducted to outer side of the handheld electronic device 1 and dissipated. In this case, the lifetime of the handheld electronic device 1 is prolonged and the use efficiency of the handheld electronic device 1 is enhanced.

Figure 2:
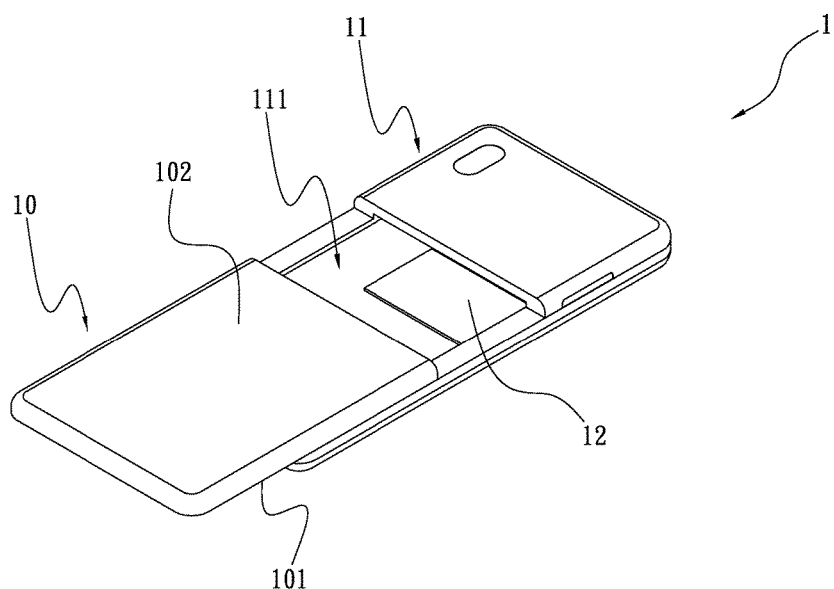
FIG. 2 is a perspective view of a second embodiment of the heat dissipation unit of handheld electronic device of the present invention.

Please now refer to FIG. 2, which is a perspective view of a second embodiment of the heat dissipation unit of handheld electronic device of the present invention. The second embodiment is partially identical to the first embodiment in structure and connection relationship and thus will not be repeatedly described hereinafter. The second embodiment is different from the first embodiment in that the handheld electronic device 1 further has a case 11 with a receiving space 111. At least one side of the receiving space 111 is an open side. At least one heat source 12 is disposed in the receiving space 111. The main body 10 is correspondingly mated with the case 11 to close the receiving space 111. The ceramic-made heat absorption section 101 of the main body 10 is correspondingly disposed in the receiving space 111 in attachment to the heat source 12. The heat dissipation section 102 of the main body 10 is correspondingly positioned outside the case 11.

The ceramic-made heat absorption section 101 is attached to the heat source 12 and received in the receiving space 111. The heat generated by the heat source 12 is transferred from the heat absorption section 101 to the heat dissipation section 102 made of heat dissipation conductor by way of conduction. Then, the heat is conducted from the heat dissipation section 102 to outer side of the handheld electronic device 1. Accordingly, the heat can be quickly dissipated to prolong the lifetime of the handheld electronic device 1.

In the second embodiment, the heat generated by the heat source 12 is transferred to the outer side of the handheld electronic device 1 by way of contact conduction. However, the way to transfer the heat to the outer side of the handheld electronic device 1 is not limited.

In conclusion, in comparison with the conventional device, the present invention has the following advantages:

1. The heat can be quickly conducted to the outer side of the handheld electronic device.
2. The lifetime of the handheld electronic device is prolonged.

The present invention has been described with the above embodiments thereof and it is understood that many changes and modifications in the above embodiments can be carried out without departing from the scope and the spirit of the invention that is intended to be limited only by the appended claims.

What is claimed is:

1. A heat dissipation unit of a handheld electronic device comprising a cover having a ceramic layer and a heat dissipation layer, the ceramic layer being made of ceramic material having properties of heat-resistance and low thermal expansion coefficient, the heat dissipation layer being a heat dissipation conductor, wherein the cover is assembled with a handheld electronic device, the ceramic layer and the heat dissipation layer being respectively positioned in the handheld electronic device and outside the handheld electronic device and the ceramic layer being in direct contact with a heat source so that heat generated inside the handheld electronic device is directly absorbed and conducted from the ceramic layer to the heat dissipation layer for dissipating, wherein the heat generated by the heat source is transferred from the ceramic layer to the heat dissipation layer by way of contact conduction.

2. The heat dissipation unit of the handheld electronic device as claimed in claim 1, wherein the handheld electronic device further has a case with a receiving space, at least one side of the receiving space being an open side, at least one heat source being disposed in the receiving space, the cover being correspondingly mated with the case to close the receiving space, the ceramic layer of the cover being correspondingly disposed in the receiving space in attachment to the heat source, the heat dissipation layer of the cover being correspondingly positioned outside the case.

3. The heat dissipation unit of the handheld electronic device as claimed in claim 1, wherein the handheld electronic device is a mobile phone or a tablet.

* * * * *